(12) United States Patent
Foster

(10) Patent No.: US 7,243,779 B2
(45) Date of Patent: Jul. 17, 2007

(54) RECIPROCATING SLAT CONVEYOR WITH V-SLATS

(76) Inventor: Raymond Keith Foster, P.O. Box 1, Madras, OR (US) 97741

( * ) Notice: Subject to any disclaimer, the term of this patent is extended or adjusted under 35 U.S.C. 154(b) by 53 days.

(21) Appl. No.: 11/047,496

(22) Filed: Jan. 31, 2005

(65) Prior Publication Data

US 2006/0249353 A1    Nov. 9, 2006

Related U.S. Application Data

(63) Continuation-in-part of application No. 10/759,399, filed on Jan. 14, 2004, now Pat. No. 6,848,569.

(51) Int. Cl.
*B65G 25/04* (2006.01)
(52) U.S. Cl. .............................. 198/750.2; 198/750.1; 198/750.4
(58) Field of Classification Search ............ 198/750.2, 198/750.1, 750.14, 750.3, 750.4, 750.5, 750.6
See application file for complete search history.

(56) References Cited

U.S. PATENT DOCUMENTS

| | | | | |
|---|---|---|---|---|
| 4,856,645 A | * | 8/1989 | Hallstrom, Jr. | 198/750.4 |
| 5,222,593 A | * | 6/1993 | Quaeck | 198/750.5 |
| 5,267,641 A | * | 12/1993 | Hallstrom, Jr. | 198/750.3 |
| 5,383,548 A | * | 1/1995 | Quaeck | 198/750.6 |
| 6,409,009 B1 | * | 6/2002 | Foster | 198/750.2 |

* cited by examiner

*Primary Examiner*—Gene O. Crawford
*Assistant Examiner*—Ramya G. Prakasam
(74) *Attorney, Agent, or Firm*—Delbert J. Barnard

(57) ABSTRACT

Fixed conveyor slats (12) in the nature of beams extend over a window in support framework (53, 100, 102, 116, 118) for the movable and fixed slats (10, 12) in a reciprocating slat conveyor. The fixed slats (12) support the movable slats (20), including in the region of the window. The movable slats (10) are in the nature of box beams, providing them with strength and stiffness in the region of the window. At the rear end of the conveyor, the movable slats (10) move onto support brackets (120) which prevent the rear end portions of the slats (10) from being damaged when they are in a position overhanging a rear wall (84) and material is dropped from above down onto the rear end portions of the slats (10).

1 Claim, 13 Drawing Sheets

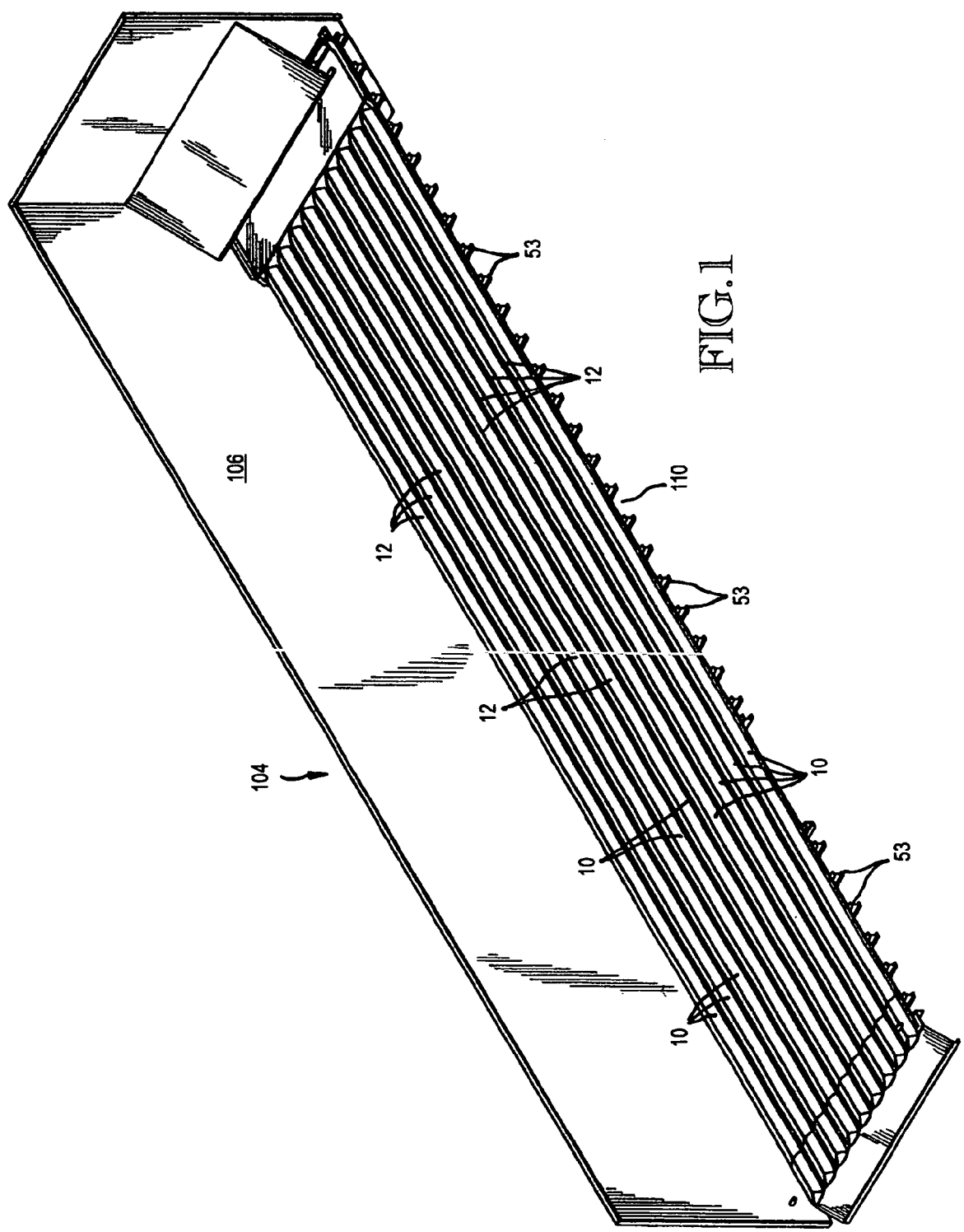

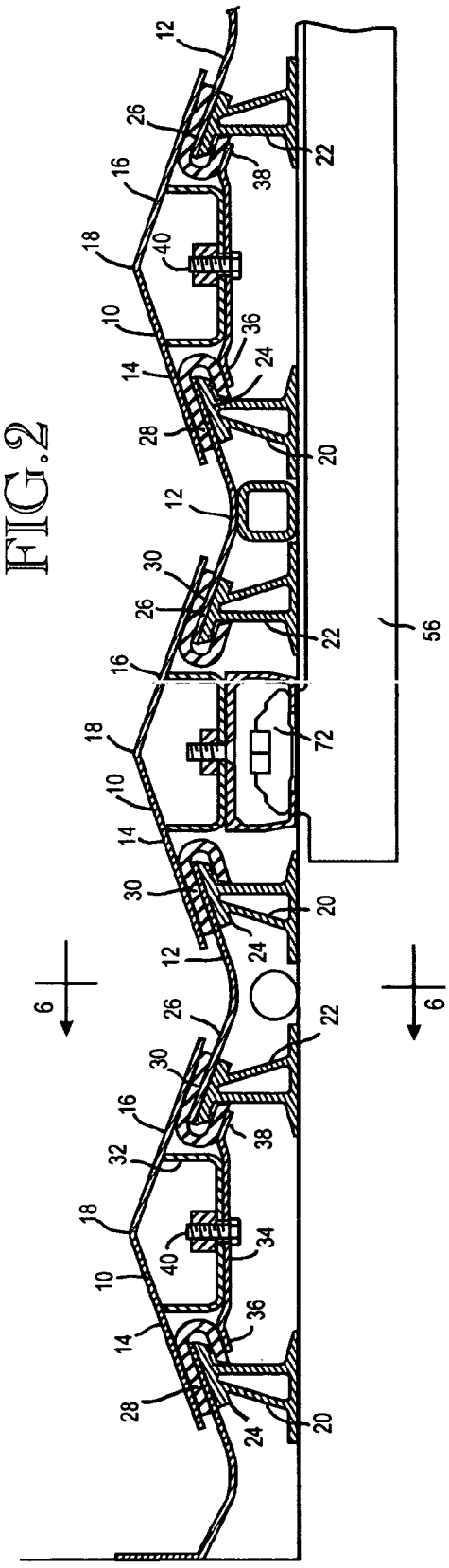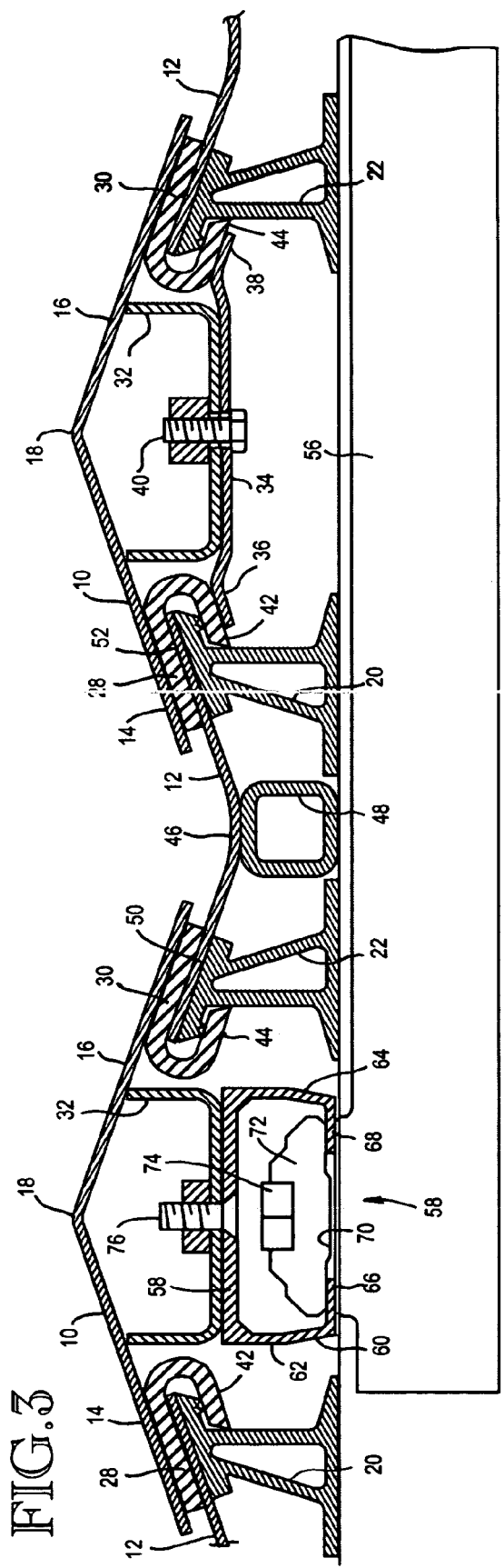

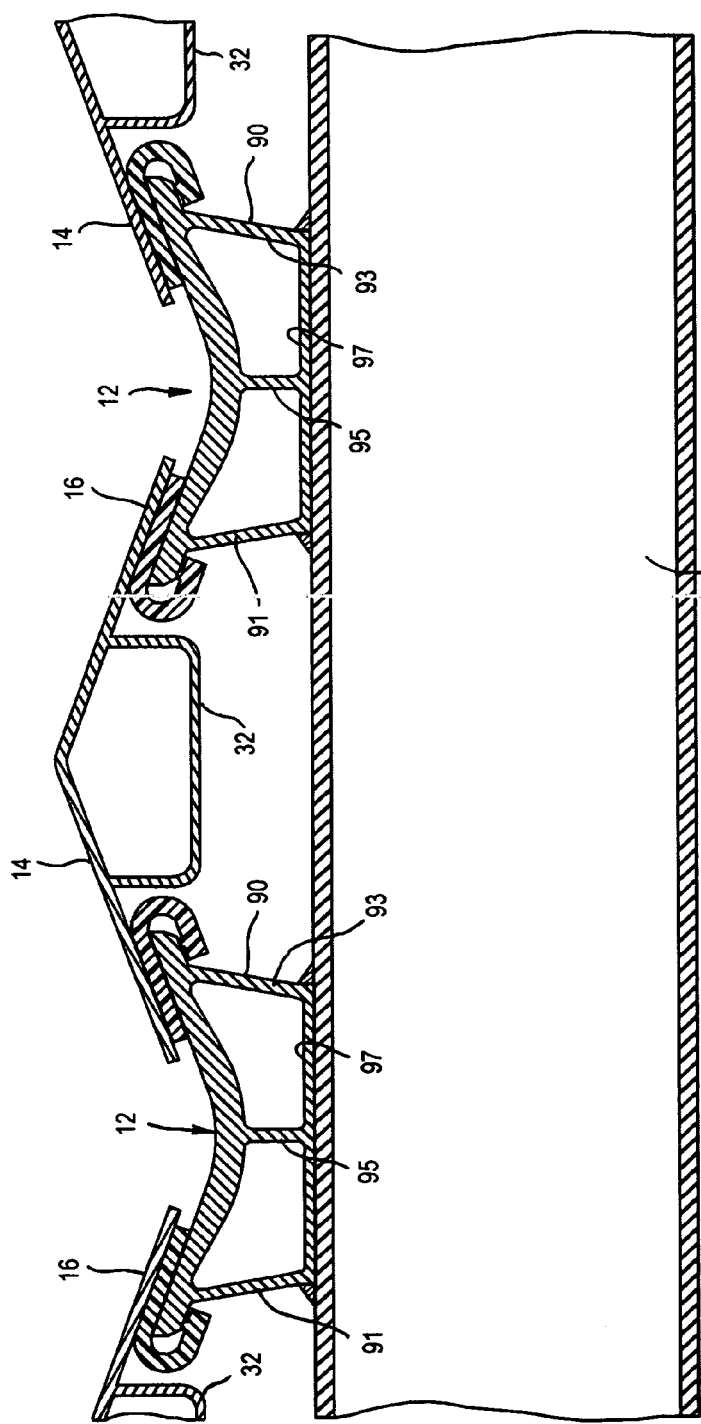
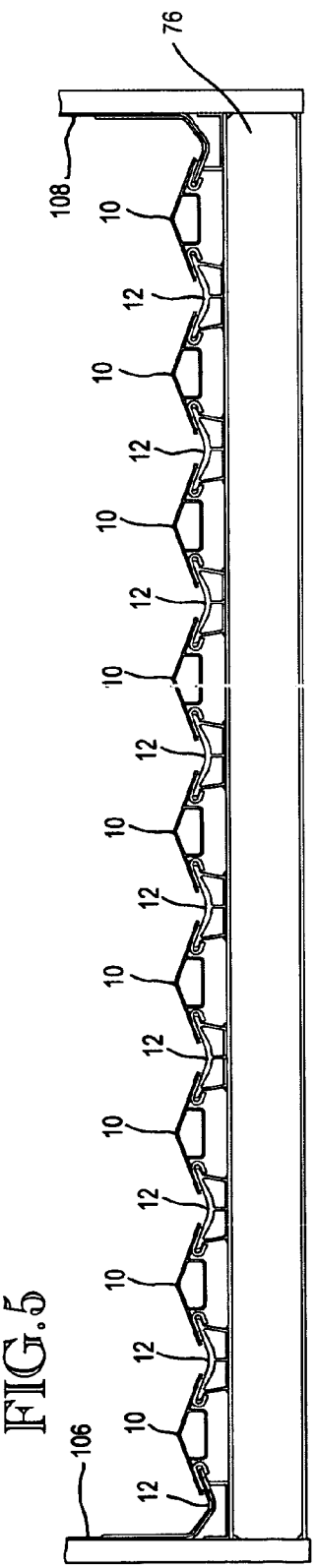

RECIPROCATING SLAT CONVEYOR WITH V-SLATS

RELATED APPLICATION

This is a continuation-in-part of my application Ser. No. 10/759,399, filed Jan. 14, 2004 now U.S. Pat. No. 6,848,569, and entitled Reciprocating Slat Conveyor With Fixed And Movable Slats.

TECHNICAL FIELD

This invention relates to reciprocating slat conveyors. More particularly, it relates to reciprocating slat conveyors comprising of laterally spaced apart movable conveyor slats and laterally spaced apart fixed conveyor slats located between the movable conveyor slats, and to a bearing and support system for mounting the movable conveyor slats for longitudinal movement.

BACKGROUND OF THE INVENTION

My U.S. Pat. No. RE 35,022, granted Aug. 22, 1995, and entitled Reduced Size Drive-Frame Assembly For A Reciprocating Slat Conveyor, discloses a reciprocating slat conveyor in which the conveyor slats are connected to transverse drive beams which are in turn connected to linear hydraulic motors. The linear hydraulic motors move the drive beams and the drive beams move the conveyor slats that are connected to them.

My U.S. Pat. No. 5,350,057, granted Sep. 27, 1994, and entitled Ball Block For Mounting Linear Motor, discloses a reciprocating slat conveyor in which the transverse drive beams are physically separated from the linear hydraulic motors. The linear hydraulic motors are connected to selected conveyor slats that are directly driven by the linear hydraulic motors. The driven conveyor slats are connected to additional conveyor slats by the transverse drive beams.
e My U.S. Pat. No. 6,409,009, granted Jun. 25, 2002, and entitled Conveyor Slat Connector And Connection Method, and my U.S. Pat. No. 6,575,293, granted Jun. 10, 2003, and entitled Connector and Connection Method For Conveyor Slats, each discloses apparatus for connecting conveyor slats to transverse drive beams.

My U.S. Pat. No. 5,044,807, granted Sep. 3, 1991, and entitled Method For Collecting And Compacting Garbage And Then Loading It Into A Road Vehicle, discloses a reciprocating slat conveyor composed of a laterally spaced apart moving conveyor slats and laterally spaced apart fixed conveyor slats that are located between the movable conveyor slats.

The present invention provides an improvement on the conveyor that is disclosed by U.S. Pat. No. 5,044,807. The improvement includes use of some technology disclosed in my above introduced U.S. Pat. Nos. 5,350,057; 6,409,009; 6,575,293 and RE 35,022, in addition to new technology. The contents of U.S. Pat. No. 5,044,870, are incorporated herein by this specification reference.

BRIEF SUMMARY OF THE INVENTION

The reciprocating slat conveyor of the present invention is basically characterized by a plurality of a laterally spaced apart, longitudinally movable conveyor slats, and by laterally spaced apart, fixed conveyor slats between the movable conveyor slats. The fixed conveyor slats have opposite side portions. The movable conveyor slats each has a cross-section formed by side portions that extend outwardly and downwardly from an apex. The side portions of the movable conveyor slats are positioned above the side portions of the fixed conveyor slats. A plurality of longitudinally movable transverse drive beams are positioned below the fixed and movable conveyor slats. The movable conveyor slats are divided into sets equal in number to the number of transverse drive beams. The movable conveyor slats of each set are connected to and move with a transverse drive beam for that set. The transverse drive beams are movable longitudinally of the conveyor below the fixed conveyor slats. The fixed conveyor slats are top portions of longitudinal beams which extend over the transverse drive beams.

Preferably, the movable conveyor slats include central portions in the nature of box beams comprising a top wall, laterally spaced apart side walls depending from the top wall, and a bottom wall interconnecting bottom portions of the side walls.

Preferably also, the fixed conveyor slats are box beams comprising laterally spaced apart side walls depending from the top portion of the fixed slat, and a bottom wall interconnecting lower portions of the side walls.

The fixed conveyor slats may also include a center wall interconnected between the top wall and the bottom wall.

According to an aspect of the invention, the fixed conveyor slats are extruded from a suitable metal alloy, e.g. an aluminum alloy.

The movable conveyor slats may have a shallow V-shaped cross-section formed by side portions that slope outwardly and downwardly from the apex. A valley region is formed between the movable conveyor slats, above fixed longitudinal beams that are positioned between the movable conveyor slats. Preferably, the fixed beams are box beams comprising a top wall, laterally spaced apart side walls depending from the top wall, and a bottom wall interconnecting lower portions of the side walls.

According to an aspect of the invention, the reciprocating slat conveyor comprises a frame below the fixed and movable slats. A rear portion of the frame includes an apron that slopes downwardly and rearwardly. The movable slats have a rear position that is closer to the rear end of the apron than to the front end of the apron. The movable slats have a front position that is closer to the front end of the apron than to the rear end of the apron. If preferred form, a plurality of laterally spaced apart support brackets project rearwardly from the apron, each in line with a related movable slat. The support brackets have upper portions on which rear end portions of the movable slats move when the slats move rearwardly from their forward positions to their rearward positions, and forwardly from their rearward positions to their forward positions. There are spaces laterally between the brackets through which material on the movable slats can fall, onto the sloping apron.

Preferably, a first bearing is positioned on top of each support bracket and a second bearing is positioned below the rear end portion of the movable slat for that bracket. The first and second bearings contact each other. Preferably, the first and second bearings have hard metal bearing surfaces that are in contact with each other. Also, the rear end portions of the movable conveyor slats preferably have rearwardly and downwardly sloping end surfaces.

The various features and aspects of the invention can be used together or separately. Also, other objects, advantages and features will become apparent from the description of the best mode set forth below, from the drawings, from the claims and principles that are embodied in the specific structures that are illustrated and described.

BRIEF DESCRIPTION OF THE SEVERAL VIEWS OF THE DRAWINGS

In the drawing, like reference numerals, designate like parts throughout the several views, and:

FIG. 1 is a fragmentary pictorial view taken from above and looking down towards the top, the passenger side, and the rear end of a trailer, showing an embodiment of the present invention;

FIG. 2 is a transverse sectional view taken substantially along line 2-2 of FIG. 6, such view showing portions of three movable slats and portions of four fixed slats that together form a reciprocating slat conveyor;

FIG. 3 is an enlarged scale view of a portion of FIG. 2 that includes two of the three movable slats shown in FIG. 2;

FIG. 4 is a view like FIG. 3, but showing fixed slats in the form of one-piece extrusions;

FIG. 5 is a full-width sectional view of the trailer and the conveyor;

DETAILED DESCRIPTION OF THE ILLUSTRATED EMBODIMENT

Figure 6:
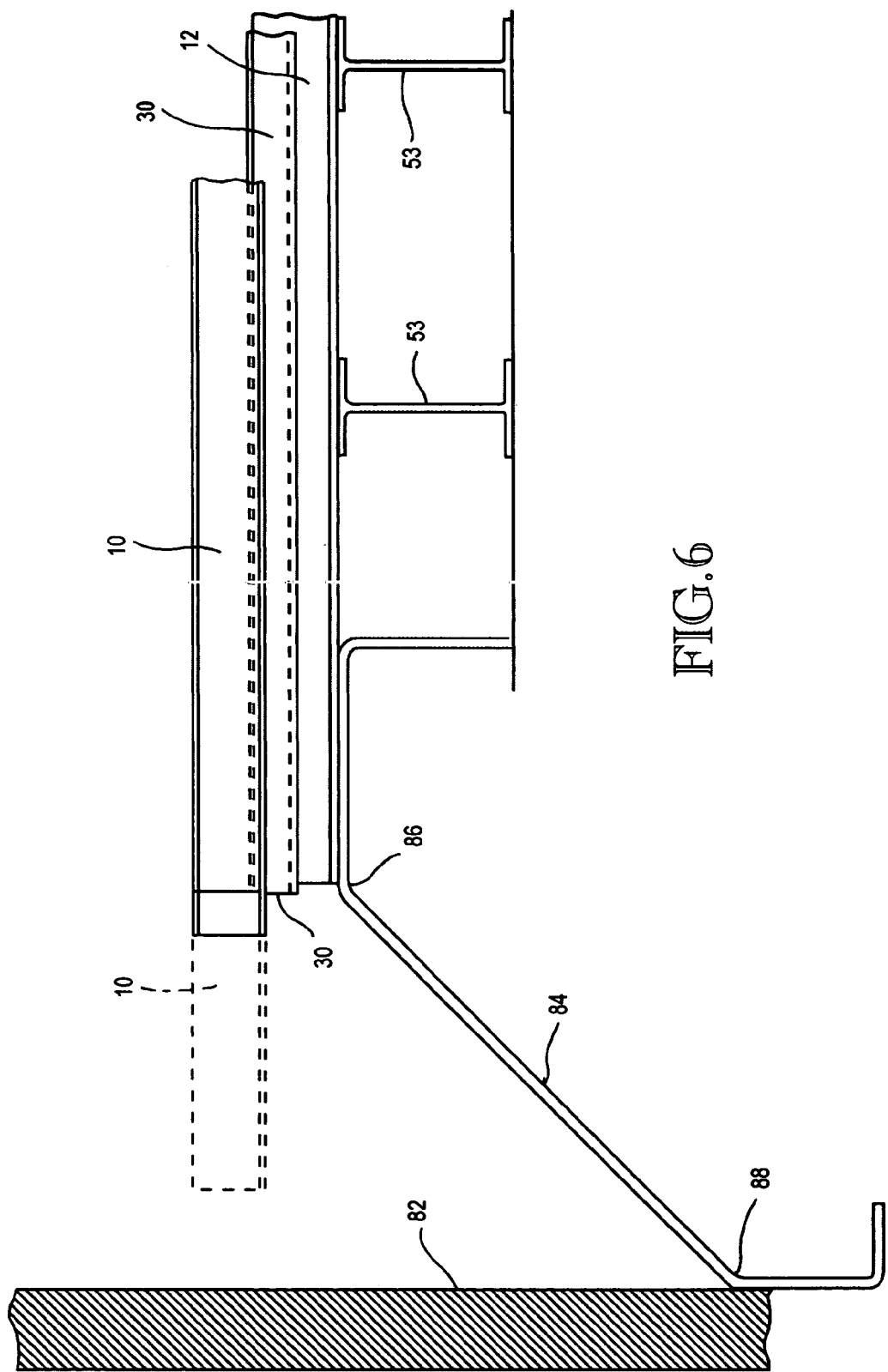
FIG. 6 is a fragmentary longitudinal sectional view, with some parts in side elevation, taken substantially along the line 6-6 of FIG. 2, such view including a broken line showing of one of the movable conveyor slats in a fully extended position over a trough formed by a door at the rear of the conveyor compartment and a downwardly and rearwardly sloping apron.

My aforementioned U.S. patent application Ser. No. 10/759,399 discloses a reciprocating slat conveyor within a container that receives bulk material. The conveyor extends substantially the full length of the container. An embodiment of this conveyor is disclosed herein. It includes movable conveyor slats 10 that are laterally spaced apart and fixed conveyor slats 12 that are laterally spaced apart and are between the movable slats 10. In the embodiment illustrated herein, the movable slats 10 are V-shaped in cross section and are composed of side portions 14, 16 that slope outwardly and downwardly from an apex 18 and together form a top wall 14, 16. See FIG. 4.

The conveyor shown by FIGS. 1 and 2 comprises a plurality of laterally spaced apart support members 20, 22. Members 20, 22 have upper portions 24, 26 that provide support for bearings 28, 30. Support members 20, 22 may be continuous members extending substantially the full length of the conveyor. Or, they can be a plurality of shorter members arranged end-to-end, with or without spaces between the members. Bearings 28, 30 are continuous members or are short members or segments that are positioned end-to-end so that together they extend substantially the full length of the conveyor.

Each pair of adjacent support members 20, 22 define a space between them in which a central portion of a moveable conveyor slat 10 is received. This movable central portion may comprise a U-shaped reinforcement member 32 that has sidewalls and a bottom wall. The tops of the sidewalls are connected to the floor member 14, 16, such as by welding. Preferably member 32 extends the full length of the slat 10. Each movable slat 10 also includes a bottom member 34 having opposite side portions 36, 38 that are in effect leaf springs. The members 34 may be relatively short in length (FIGS. 7 and 8) and be longitudinally spaced apart along the slats 10. Nut and bolt assemblies 40 are used to secure the bottom members 34 to the bottom wall of the reinforcement member 32.

Bearings 28, 30 include upper surfaces that are contacted by the side portions of the slat wall 14, 16. Bearings 28, 30 also include lower bearing surfaces 42, 44. The side parts 36, 38 of the bottom members 34 have upper surfaces that confront the lower bearing surfaces 42, 44. Preferably, the side portions 36, 38 of the bottom members 34 are spring loaded against the bottom bearing surfaces 42, 44. That is, the side portions 36, 38 are biased upwardly and when the slats 10 are installed, the bearings 28, 40 push down on the side portions 36, 38. The bearings 28, 40 are preferably made from a self lubricated plastic material, the use of which is standard in the reciprocating slat conveyor art.

As best shown by FIG. 2, the fixed slats 12 extend laterally between adjacent supports 22, 20. Fixed slats 12 may have a shallow V-shaped cross section with a central valley portion 46 that is connected to a longitudinal support beam 48. The opposite side portions 50, 52 of the fixed slats 12 are secured to the upper portions 24, 26 of the support members 20, 22. The longitudinal support beams 48 cross over and are supported on the tops of transverse frame beams 52 (FIG. 3).

According to an aspect of the invention, every third movable conveyor slat 10, laterally across the width of the conveyor, is connected to one of three transverse drive beams 55, 56, 57. FIGS. 1 and 2, show drive beams 56. One of the movable conveyor slats 10 is shown connected to transverse drive beam 56 by a clamp structure 58 that is like one of the clamp structures disclosed in the aforementioned U.S. Pat. Nos. 6,409,009 and 6,575,293. According to an aspect of the invention, each movable conveyor slat 10 is connected to the top wall 58 of a channel member 60 that is like the floor slats 70 disclosed in U.S. Pat. No. 6,575,293. Channel member 60 has the top wall 58, a pair of side walls 62, 64 and a pair of bottom flanges 66, 68. Bottom flanges 66, 68 extend laterally inwardly from the lower edges of the side walls 62, 64, in cold planar parallelism. Flanges 66, 68 are positioned vertically between a lower clamp surface 70 and an upper clamp surface that is a part of clamp member 72.

As disclosed in U.S. Pat. No. 6,575,293, the clamp surfaces include complementary projections and recesses. The flanges 66, 68 are vertically between the projections and recesses. A series of clamp nuts, one of which is designated 74 in FIG. 2, connect the upper clamp member 72 to the transverse drive beam 56. When the bolts 74 are tightened, the clamp member 72 is moved towards the transverse drive beam 56. The projections on the clamp member 72 move relatively into the recesses in the clamp surface 70 and the projections on the clamp surface 70 move into recesses on the clamp member 72. The projections and recesses deform the flanges 66, 68 in the manner disclosed in U.S. Pat. No. 6,575,293. The U-shaped channel member 60 is thus formerly connected to the transverse drive beam 56. A series of nut and bolt assemblies 76 connect the top walls 58 of the channel member 60 through the bottom wall of the U-shaped reinforcement member 32. Accordingly, the movable conveyor slat 10 and its channel member 60 are secured to the transverse drive beam 56.

FIG. 6 is a longitudinal sectional view through a rear portion of the conveyor. It includes a solid line showing of a conveyor slat 10 in a forward position and a broken line showing of the same conveyor slat 10 in a rearward position. The end region 80 of the support structure for the conveyor slat 10 is shown spaced forwardly from a rear door 82. Door 82 extends across the full width of the back end of the conveyor. In FIG. 6, door 82 is shown in a closed position. Door 82 is preferably hinge connected so that it can be swung open so that the contents of a conveyor can be discharged out of a rear opening in the trailer box or other container in which the conveyor is mounted. As shown by FIG. 6, an apron 84 slopes downwardly and rearwardly from a front end 86 to a rear end 88. Apron 84 is a flat plate member that extends laterally across the full width of the conveyor. When the slats 10 are moved forwardly, their rear ends are closely adjacent the upper front end 86 of the apron 84. When the conveyor slats 10 are in a rearward position, they are closer to the door 82 and the rear end portion 88 of the apron 84 than they are to the front end portion 86 of the apron 84. Material on the conveyor will be discharged rearwardly off of the rear end of the conveyor into the region formed by and between the door 82 and the apron 84. This region is in the shape of a triangular prism. When the door 82 is closed, this region will fill up with the material being conveyed. Then, when the floor 82 is opened, the conveyor slats 10 will move material rearwardly over the apron 84.

In the embodiment of FIGS. 4 and 5, the fixed slats 12 may be top walls of laterally spaced apart beams 90 having upper side portions 92, 94 that provide support for bearings 28, 30. Bearings 28, 30 may be continuous members extending substantially the full length of the conveyor. Or, they can be a plurality of shorter members arranged end-to-end, with or without spaces between the members.

The beams 90 may include, in addition to top wall 12, side walls 91, 93, a center wall 95 and a bottom wall 97. Beams 90 may be metal extrusions. Their shape makes them a form of "box" beam. They are welded or otherwise secured to the frame member 53.

Figure 7:
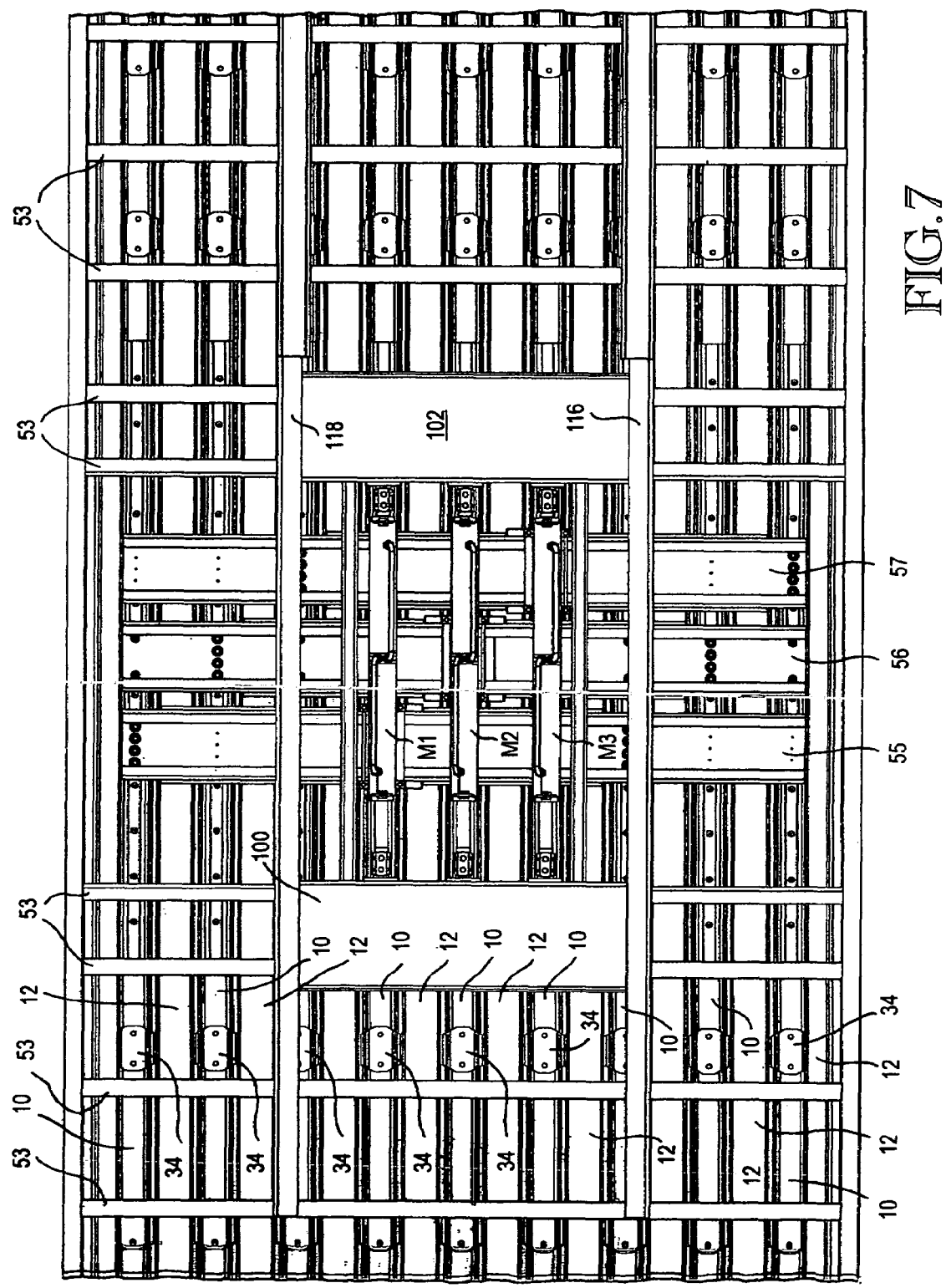
FIG. 7 is a bottom plan view of a fragmentary portion of the conveyor, looking towards the drive assembly for the movable slats.
Figure 8:
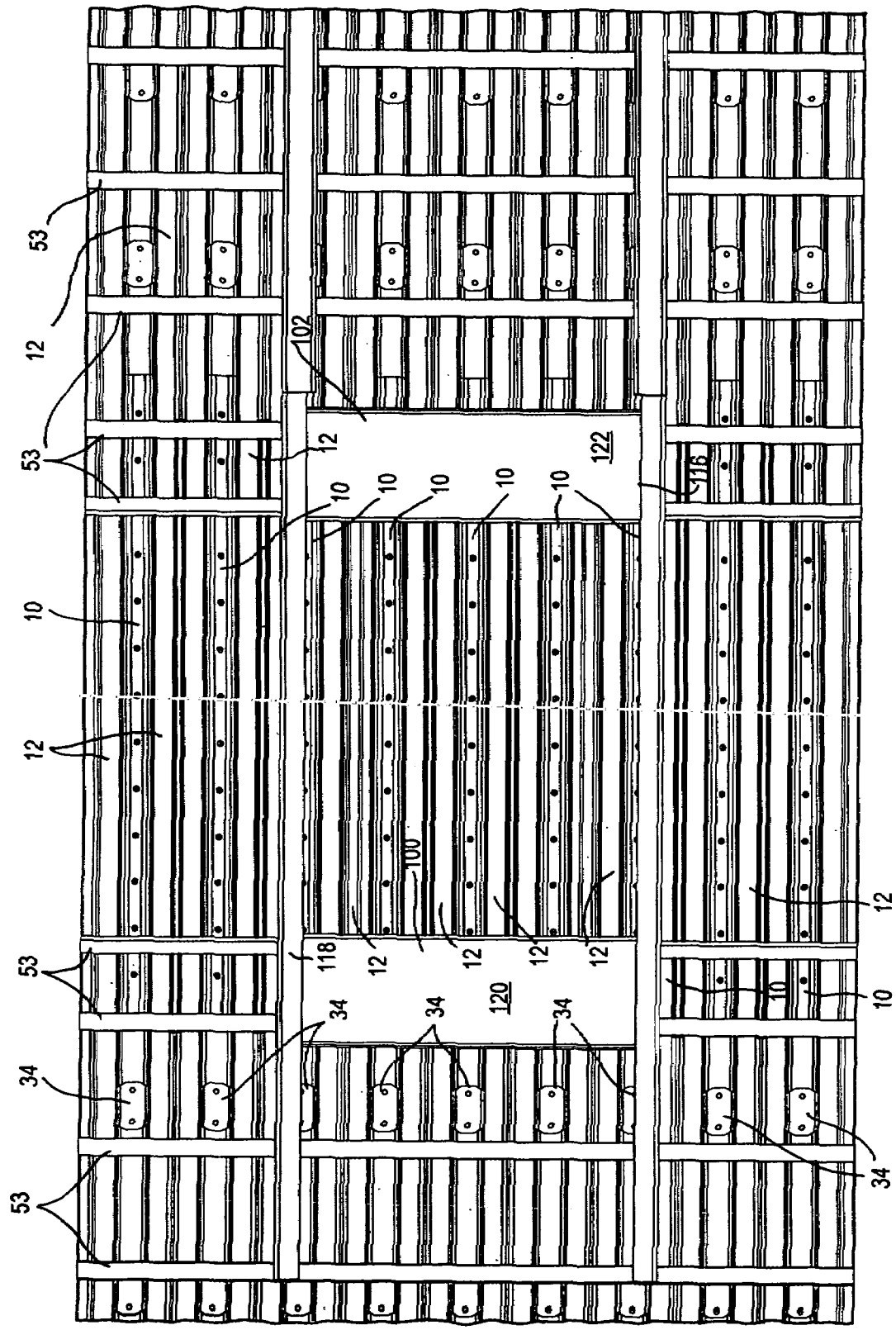
FIG. 8 is a view like FIG. 7, but with the transverse drive beams and hydraulic drive units omitted, for showing the lower portions of the fixed and movable slats in the region of the drive assembly.

Each pair of adjacent beams 90 define a space between them in which a central portion of a movable conveyor slat 10 is received. This movable central portion may comprise a U-shaped reinforcement member 32 that has sidewalls and a bottom wall. The tops of the sidewalls are connected to the floor member 14, 16, such as by welding. Preferably member 32 extends the full length of the slat 10. Each movable slat 10 also includes retainer members 34 having opposite side portions that are in effect leaf springs (FIGS. 7 and 8). The members 34 may be relatively short in length and be longitudinally spaced apart along the slats 10. Nut and bolt assemblies are used to secure the bottom members 34 to the bottom wall of the reinforcement member 32. This is disclosed in detail in my copending application Ser. No. 10/759,399, the contents of which are incorporated herein, by this specific reference to such application.

Bearings 28, 30 include upper surfaces that are contacted by the side portions of the slat walls 14, 16. Bearings 28, 30 also include lower bearing surfaces. The side parts of the bottom members 34 have upper surfaces that confront the lower bearing surfaces. Preferably, the side portions of the bottom members 34 are spring loaded against the bottom bearing surfaces, as disclosed in Ser. No. 10/759,399. As best shown by FIG. 4, the fixed slats 12 extend laterally between adjacent bearings 28, 30. In the illustrated embodiment, the fixed slats 12 have a shallow V-shaped cross section with a central valley portion.

According to an aspect of the invention, every third movable conveyor slat 10, laterally across the width of the conveyor, is connected to one of three transverse drive beams 55, 56, 57. In FIGS. 1 and 2, one of the drive beams is designated 56. A slat 10 is shown connected to a transverse drive beam 56 by a clamp structure that is like one of the clamp structures disclosed in the aforementioned U.S. patent application Ser. No. 10/759,399.

Figure 14:
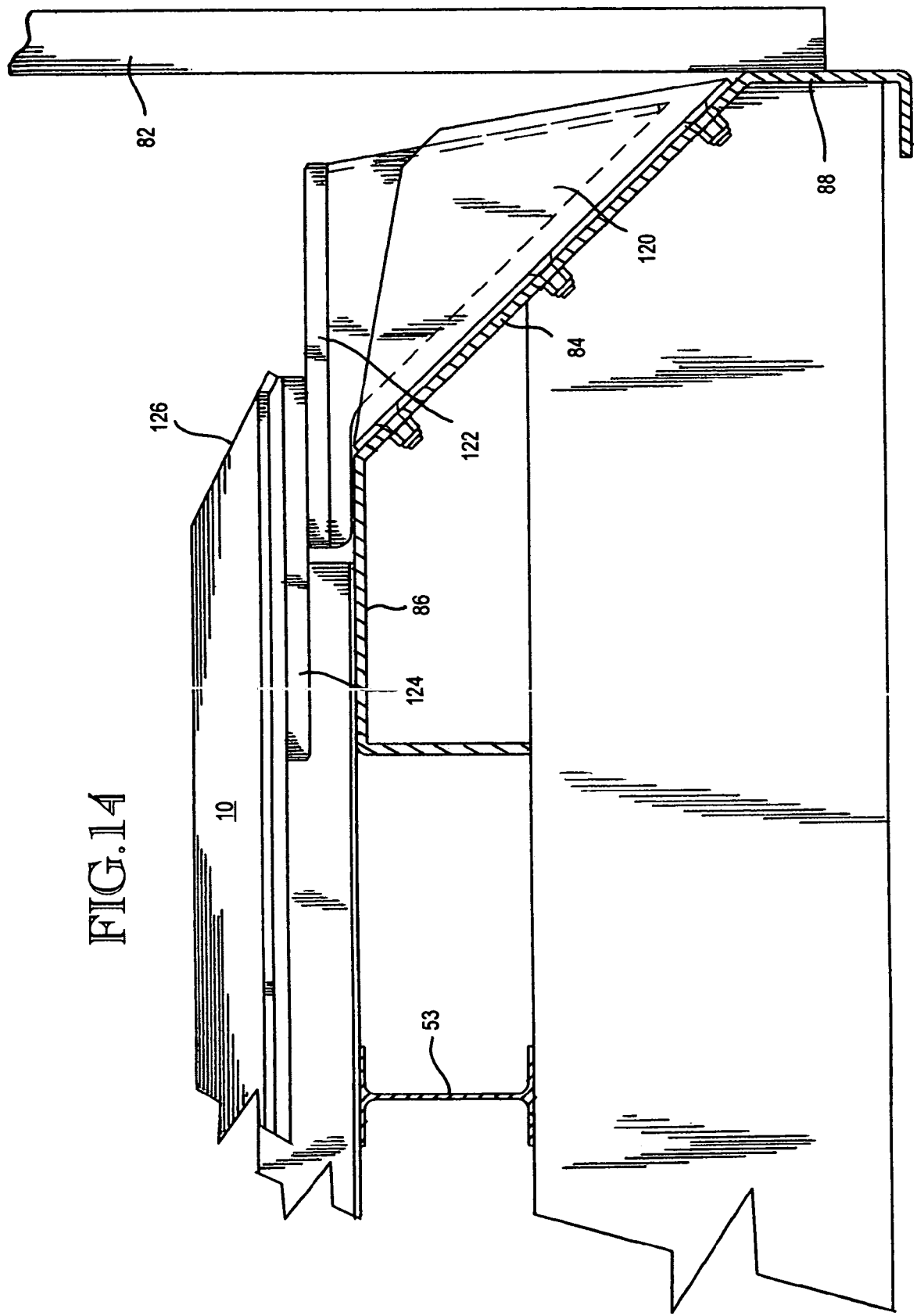
FIG. 14 is a side elevational view of FIG. 12, taken from the driver's side of the trailer.

As is well known in the art, a separate linear hydraulic motor is connected to each transverse drive beam. FIG. 14, for example, shows a Running Floor II® drive assembly connected to the moveable slats. This assembly is described in detail in my U.S. Pat. No. 4,748,893, the contents of which are incorporated herein by this specific reference to that patent. In a conveyor that includes three transverse drive beams 55, 56, 57, there are three linear hydraulic motors M1, M2, M3. The movable components of the linear hydraulic motors are connected to the transverse drive beams 55, 56, 57. The stationary components are connected to a portion of the frame structure 100, 102 (FIGS. 7 and 8) in which the conveyor is supported. Alternatively, the movable components of the linear hydraulic motors may be connected to portions of three different movable conveyor slats, one from each of the three sets of movable conveyor slats. Then, the conveyor slats for each set can be connected together by a transverse drive beam that is spaced axially from the linear hydraulic motors. In this embodiment, the transverse drive beam serves to connect the driven slat (the slat that is connected to the linear hydraulic drive motor) to the remaining slats of the set.

Figure 9:
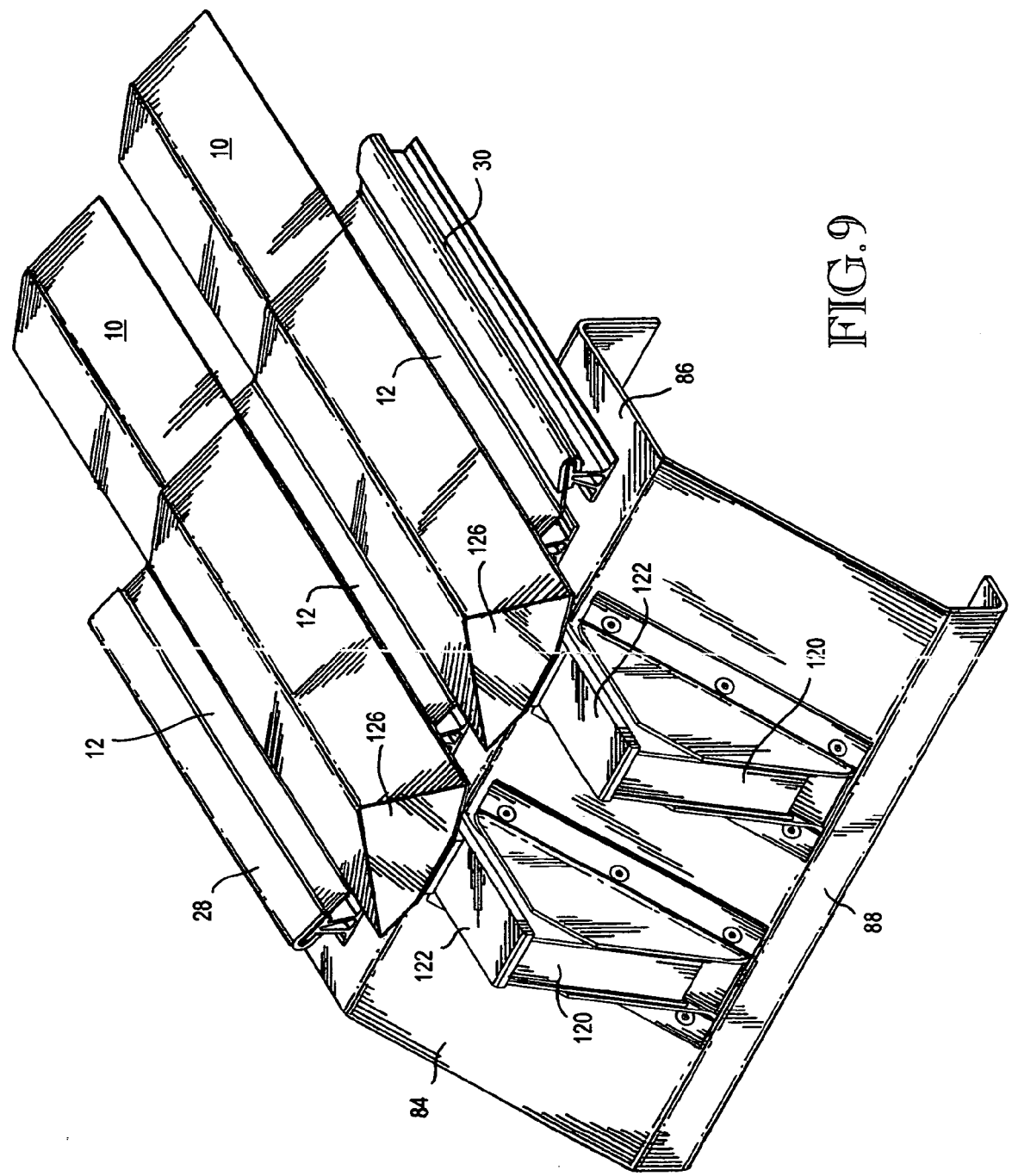
FIG. 9 is a fragmentary pictorial view, taken from above and looking down towards the top, rear end and driver side of the portion of the conveyor shown in FIG. 9, such view showing the movable slats in a forward position.

FIG. 9 is an end elevational view looking into the rear end of a trailer box 104. Trailer box 104 has a driver-side wall 106, a passenger-side wall 108 and a base structure 110 for the conveyor slats 10, 12. A baffle 112 is provided at the front end of the trailer box rearwardly of the front wall 114. FIG. 1 shows the trailer box 104 with the passenger-side wall removed. Baffle 112 slopes downwardly and rearwardly and overhangs a rear portion of a cleanout plow P. The cleaning plow P is disclosed in detail in my aforementioned co-pending application Ser. No. 11/047,076, filed Jan. 31, 2005, and entitled Clean Out Apparatus For Reciprocating Slat Conveyor.

FIGS. 7 and 8 show the underneath side of framework that provides a support for the slats 10, 12. This framework is composed of longitudinal members 116, 118 and transverse frame members 53, 120, 122. In a selected length region of the framework a window is defined by and longitudinally between frame members 120, 122, as shown by FIGS. 7 and 8. As shown by FIG. 7, the transverse drive beams 55, 56, 57 are located in this window. They are connected to the movable conveyor slats 10 so that when the transverse drive beams 55, 56, 57 move, they move the slats with them. Specifically, one-third of the slats 10 are connected to drive beam 55. Longitudinal movement of beam 55 moves the slats 10 that are connected to it longitudinally of the conveyor. A second third of the slats 10 are connected to beam 56. Longitudinal movement of the beam 56 will move with it the set of slats 10 that are connected to it. The third set of slats 10 are connected to drive beam 57. Movement of beam 57 in the longitudinal direction will move with it the slats 10 that are connected to it. Fixed end portions of the drive motors M1, M2, M3 are connected to the transverse frame beams 100, 102. Movable center portions of the drive motors M1, M2, M3 are connected to the transverse drive beams 55, 56, 57. In use, all three drive motors M1, M2, M3 are moved together in the unloading direction. This moves all three transverse drive beams 55, 56, 57 in the unloading direction. It also moves all of the movable slats 10 in the unloading direction. At the end of slat travel, drive motor M1 alone is reversed so that it retracts the drive beam 55 to which it is connected. As a result, the movable slats 10 connected to drive beam 55 are retracted back to a start position while the other two drive beams 56, 57 and the slats 10 connected to them remain stationery. The load on the conveyor will be held by the stationery slats 10, and the fixed slats 12, whereas the retracting slats 10 will slide under the load back to the start position. This procedure is repeated next with transverse drive beams 56, and the slats 10 connected to it, and then with the transverse drive beam 57 and the slats 10 that are connected to it. When all of the slats are back to a start position, the sequence is repeated.

Both front and rear of the window, the fixed conveyor slats 12 are connected to the framework. In the region of the window, the fixed slats 12 span or extend over the window. Preferably, the fixed slats 12 are in the nature of beams so that they are sturdy in the region of the window where they are not supported from below by framework as they are both forwardly and rearwardly of the window. The movable conveyor slats 10 are preferably also beams, e.g. box beams, they rest on and are supported by fixed slats 12, including in the region of the window.

FIGS. 9-15 show a modification at the rear end of the conveyor. In the embodiment of these figures, a support bracket 120 is positioned on the baffle 84 in line with each movable slat 10. Each baffle 120 is connected to the wall 84 and it extends upwardly to a top where a bearing 122 is situated. Bearing 122 may be a block of tool steel or some other suitable substance. As shown by FIGS. 11 and 12-15, a complementary block 124 is connected to the lower rear portion of each slat 10. Block 124 is preferably also constructed from a tool steel or suitable material. The blocks 124 sit on the blocks 122 and function as bearings during front and rear movement of the slats 10.

Figure 10:
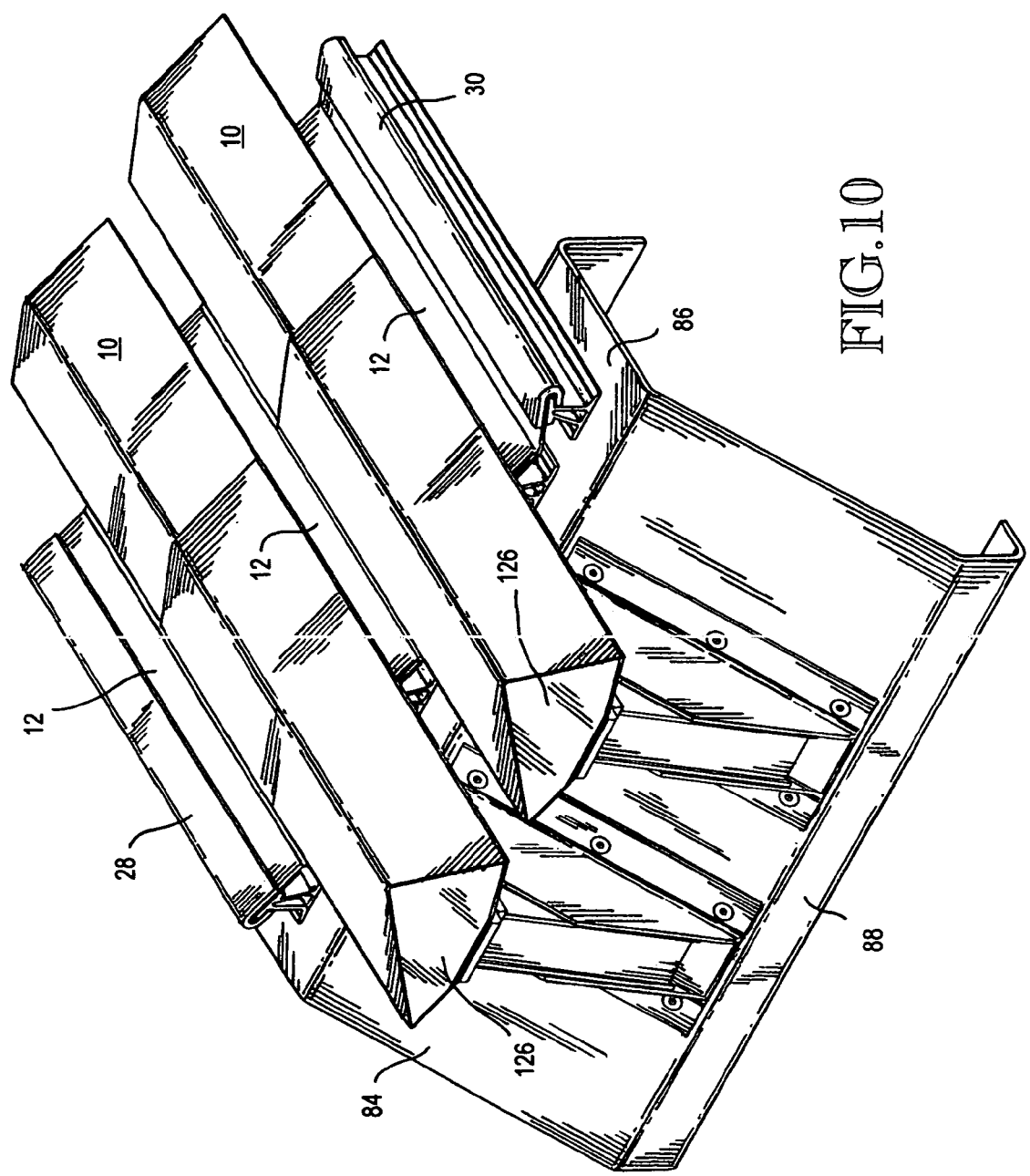
FIG. 10 is a view like FIG. 9, but showing the movable slats in a rearward position.
Figure 11:
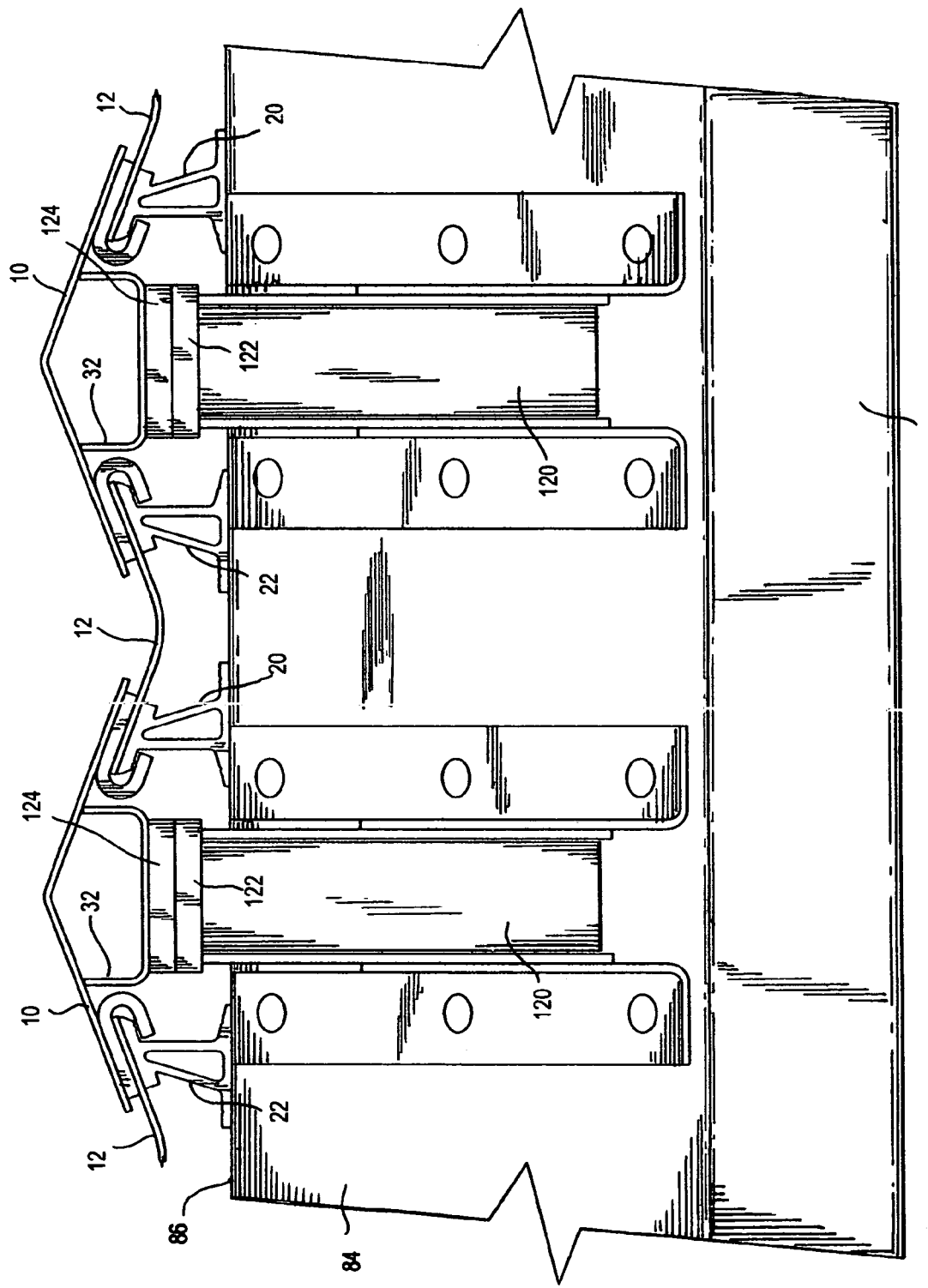
FIG. 11 is a rear end elevational view of FIG. 10, showing the movable slats in cross section.
Figure 12:
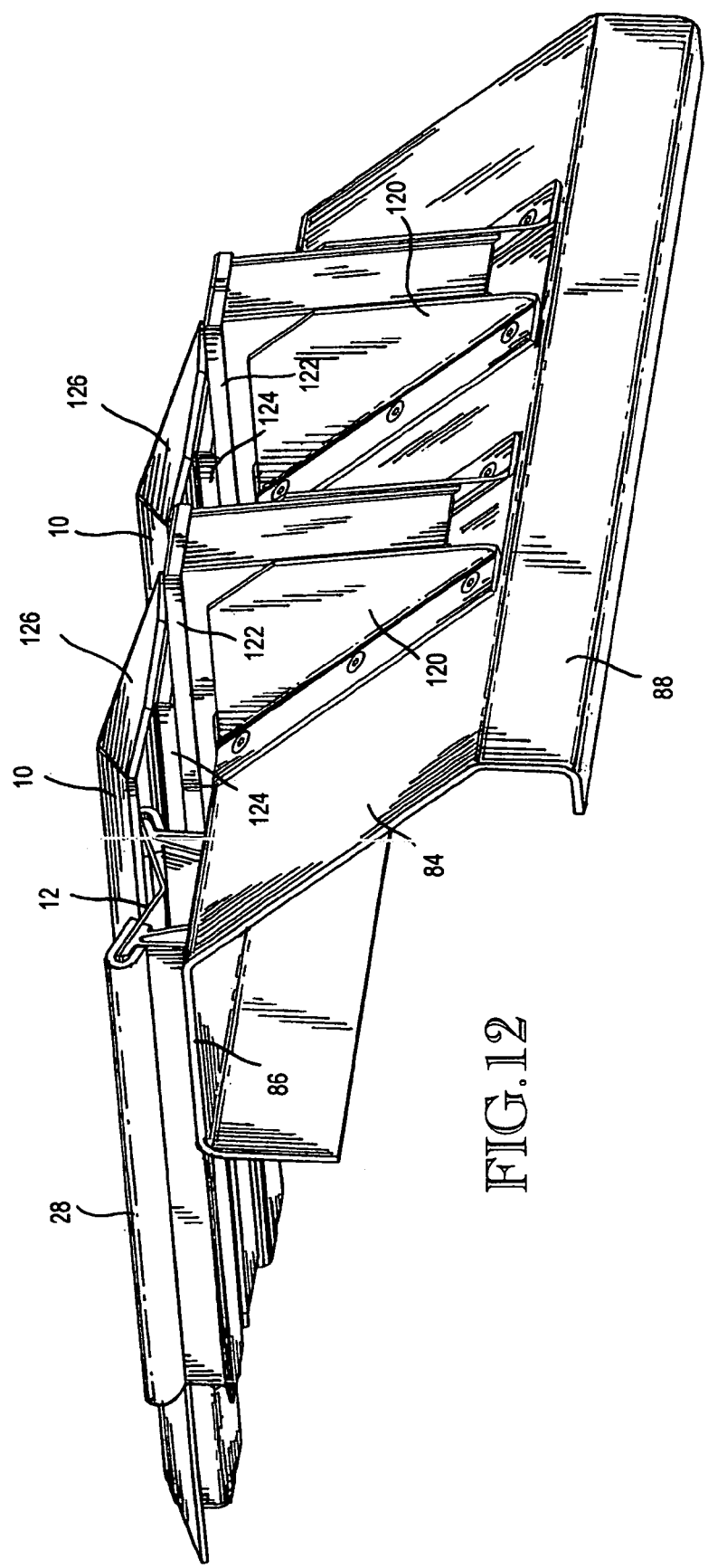
FIG. 12 is another pictorial view of the portion of the conveyor shown by FIGS. 9-11, such view being taken from below and looking up towards the bottoms of the conveyor slats, and towards the driver's side and rear end portions of the components shown by the view, such view showing movable conveyor slats moved forwardly from their rear end positions.
Figure 13:
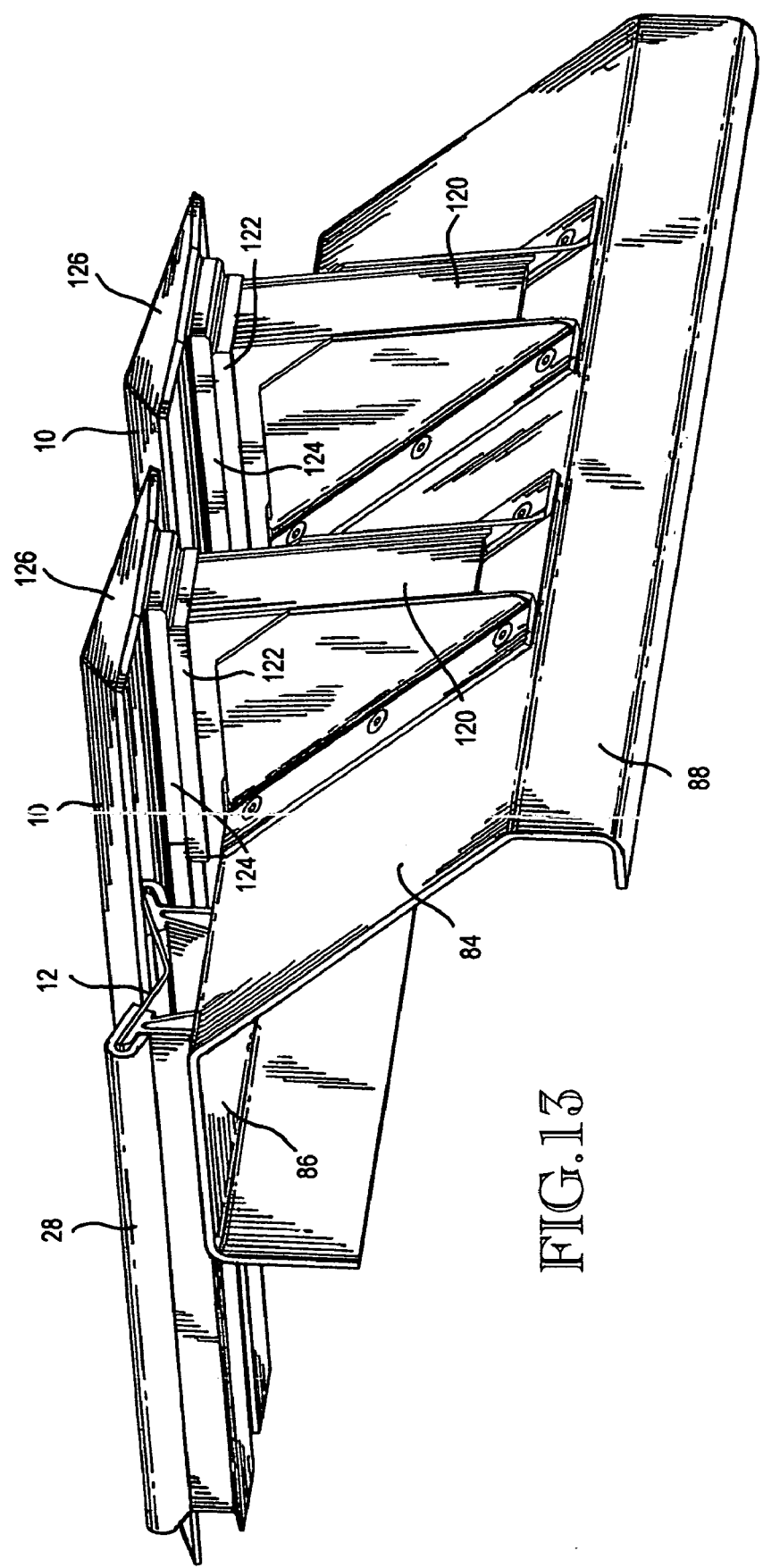
FIG. 13 is a view like FIG. 12, showing the movable conveyor slats moved rearwardly from the position shown in FIG. 12.
Figure 15:
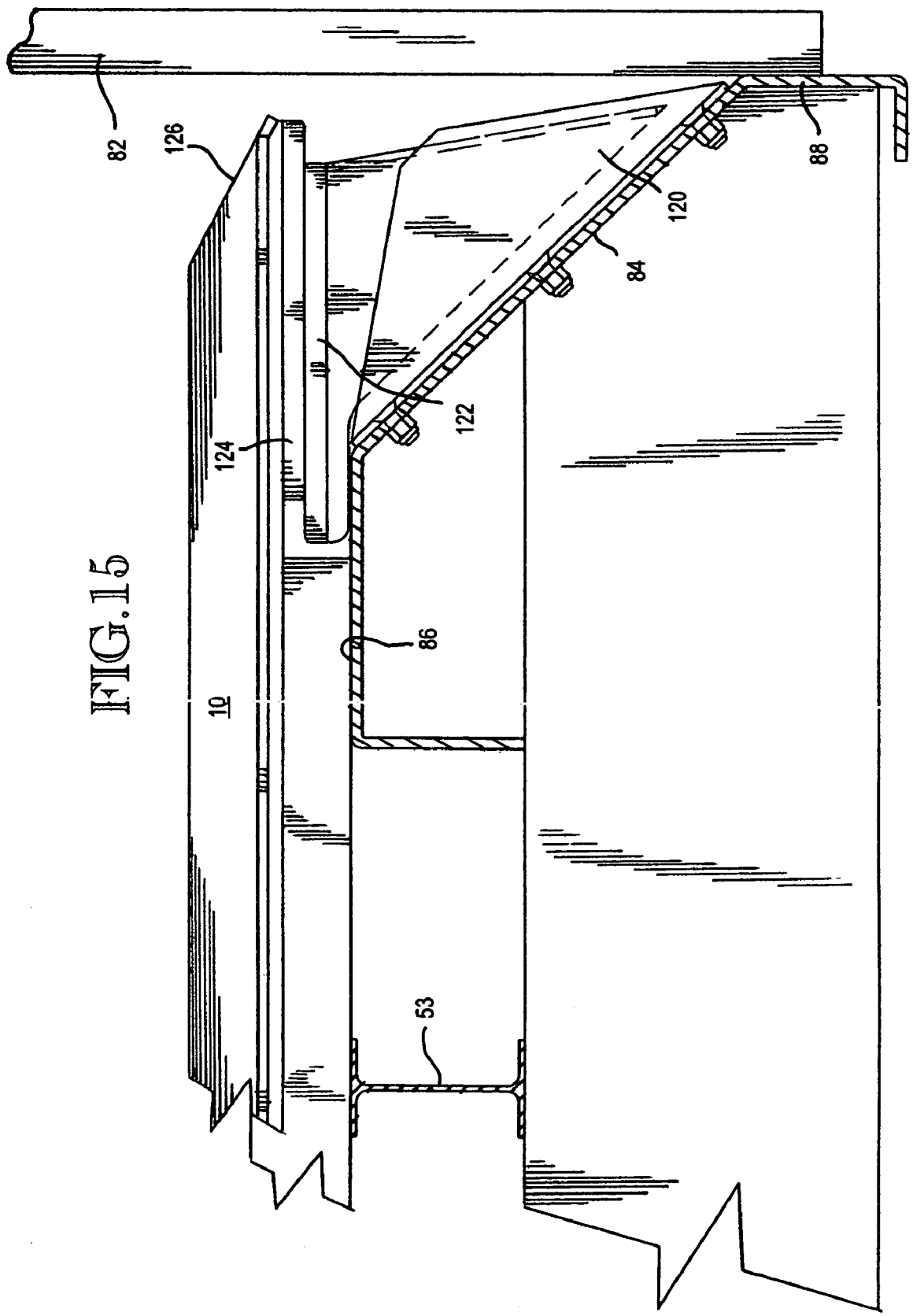
FIG. 15 is a side elevational view of FIG. 13, taken from the driver's side of the trailer.

As shown by FIGS. 9, 12 and 14, when the slats 10 are in a forward position, the bearings 122 on top of brackets 120 are exposed. When the slats 10 are moved rearwardly, they move onto and are supported by the brackets 120. Specifically, the bearings 124 slide on the bearings 122 and when the slats 10 are in a rearmost position, the rear end portions of the slats 10 are positioned over the bearings 122. This is shown by FIGS. 10, 13 and 15. As should be evident, the brackets 120 provides support for the rear end portions of the slats 10 when the slats 10 are in their rearmost positions. They protect the end portions of the slats 10 from being damaged by material being dropped onto the slats 10, 12 from above. Lateral spaces between the brackets 120 allow material to fall down onto the wall 84 and slide out of the region.

According to an aspect of the invention, the movable slats 10 have rear end walls 126 that are closed and slope downwardly and rearwardly.

The illustrated embodiments are only examples of the present invention and, therefore, are non-limitive. It is be understood that many changes in the particular structure, material and feature of the invention made be made without departing from the spirit and scope of the invention. Therefore, it is my intention that my patent rights not be limited by the particular embodiments that are illustrated and described herein, but rather are to be determined by the following claims, interpreted according to accepted doctrines of patent claim interpretation, including use doctrine of equivalents and reversal of parts.

What is claimed is:

1. A reciprocating slat conveyor, comprising:
   framework providing a support for fixed and movable conveyor slats, said framework defining a window sized to receive three transverse drive members and allow said drive members to reciprocate in the window longitudinally of the conveyor;
   three transverse drive members in said window;
   laterally spaced apart fixed slats, extending longitudinally of the conveyor and supported on the framework both forwardly and rearwardly of the window;
   said fixed slats extending longitudinally over the window;
   said fixed slats supporting elongated bearings that extend length wise of the slats substantially throughout the full length of the slats;
   laterally spaced apart movable conveyor slats extending longitudinally of the conveyor between the fixed slats, said movable conveyor slats being divided into sets, one set for each transverse drive member,
   wherein each set of movable conveyor slats is connected to a related one of the transverse drive members, so that each set of slats will move with its transverse drive member;
   said movable slats having portions that rest on the bearings so that during longitudinal movement of the movable slats said slats will move on the bearings;
   wherein the fixed conveyor slats are box beams having spaced apart side walls, a top and a bottom spaced below the top and extending between the side walls; and
   wherein the movable conveyor slats comprise longitudinal box beams that are disposed between the fixed conveyor slats, said box beams having spaced apart sidewalls, a top and a bottom spaced below the top and extending between the sidewalls.

* * * * *